US010616274B1

(12) United States Patent
Chang et al.

(10) Patent No.: US 10,616,274 B1
(45) Date of Patent: Apr. 7, 2020

(54) DETECTING CLOAKING OF WEBSITES USING MODEL FOR ANALYZING URL REDIRECTS

(71) Applicant: Facebook, Inc., Menlo Park, CA (US)

(72) Inventors: Zixiao Chang, Seattle, WA (US); Emanuel Alexandre Strauss, San Mateo, CA (US); Hongda Ma, Mountain View, CA (US)

(73) Assignee: Facebook, Inc., Menlo Park, CA (US)

( * ) Notice: Subject to any disclaimer, the term of this patent is extended or adjusted under 35 U.S.C. 154(b) by 204 days.

(21) Appl. No.: 15/828,219

(22) Filed: Nov. 30, 2017

(51) Int. Cl.
*H04L 29/06* (2006.01)
*G06N 20/00* (2019.01)
*G06F 16/955* (2019.01)

(52) U.S. Cl.
CPC ...... *H04L 63/1483* (2013.01); *G06F 16/9566* (2019.01); *G06N 20/00* (2019.01)

(58) Field of Classification Search
CPC .. H06L 63/1483; G06F 16/9566; G06N 20/00
See application file for complete search history.

(56) References Cited

U.S. PATENT DOCUMENTS

| | | | |
|---|---|---|---|
| 2007/0192855 A1* | 8/2007 | Hulten | H04L 63/1441 726/22 |
| 2007/0208822 A1* | 9/2007 | Wang | H04L 63/1416 709/217 |
| 2009/0094175 A1* | 4/2009 | Provos | G06F 21/564 706/12 |
| 2010/0313266 A1* | 12/2010 | Feng | G06F 21/566 726/23 |
| 2011/0276716 A1* | 11/2011 | Coulson | H04L 29/12066 709/238 |
| 2016/0142439 A1* | 5/2016 | Goutal | H04L 63/1483 726/22 |

OTHER PUBLICATIONS

Akiyama et al., Analyzing the ecosystem of malicious URL redirection through longitudinal observation from honeypots, Elsevier, Jan. 2017.*
Google Webmaster Central Blog—Specify your canonical, Google, 2009.*

* cited by examiner

*Primary Examiner* — Minh Dinh
(74) *Attorney, Agent, or Firm* — Fenwick & West LLP

(57) ABSTRACT

An online system transmits to a mobile device a feed story that includes a uniform resource locator (URL) of a feed story website. The online system receives from the mobile device a URL log that includes URLs that the mobile device accessed in response to requesting content from the feed story website. The online system extracts a feature of at least one URL in the log, and inputs the extracted feature into a model that was trained, using machine learning, to identify websites that perform cloaking. The model generates a score indicating a likelihood that the feed story website performs cloaking based the extracted feature. The online system compares the score to a threshold to determine whether the feed story website performs cloaking. If the online system determines that the feed story website performs cloaking, the online system limits delivery of content including the URL of the feed story website.

20 Claims, 3 Drawing Sheets

300

| Requested URL | http://www.a.com/abc |
| --- | --- |
| Redirect 1 | http://www.a.biz/abc |
| Redirect 2 | https://www.a.biz/abc/redirect=http://www.def.com/1 |
| Redirect 3 | http://www.def.com/1 |
| Redirect 4 / Webpage to User | http://www.def.xxx |

350

| Requested URL | http://www.a.com/abc |
| --- | --- |
| Redirect 1 / Webpage to Emulator | http://www.a.biz/abc |

US 10,616,274 B1

DETECTING CLOAKING OF WEBSITES USING MODEL FOR ANALYZING URL REDIRECTS

BACKGROUND

This invention relates generally to detecting website cloaking by extracting features of URL redirects and providing the features to a machine-learning based model configured to predict the likelihood of the website performing cloaking.

Online systems often enforce policies regarding what content can be posted to the online system and what content can be linked to content distributed by the online system. For example, an online social networking system may restrict users from posting and linking to certain types of content, such as adult content, violent content, threats, content related to criminal activity, or fraudulent content. To enforce these policies, the online system monitors content and blocks content that is determined to be in violation of a policy. To thwart the online system's ability to detect linked content that violates a policy, certain websites perform cloaking of the content they publish via the online system.

Websites perform cloaking by providing different content to different users. For example, a website may identify a user that is requesting content from the website, or identify information describing the device, such as the device's IP address. The website then provides "good" content to devices that are determined to be within an online system that enforces a policy, such as devices used for monitoring and maintaining an online system, for example, a social networking system. The website provides "bad" content (e.g., content that is in violation of a policy) to other devices, such as devices that are used by users of the online system and that are identified as being external the online system. The good content shown to devices within the online system "cloaks" the content that is shown to external devices, making it difficult for the online system to determine the true nature of the content that the website is delivering to the external users of the online system. Conventional techniques fail to detect policy violations by websites that perform cloaking.

SUMMARY

To detect websites that deliver bad content to client devices, an online system can have client devices (e.g., mobile devices) that access the online system transmit uniform resource locator (URL) logs to the online system for analysis. The online system may provide to the mobile device content, such as an item in a newsfeed, that includes a link to a webpage in the form of a URL. In some cases, when a mobile device accesses the URL included in the newsfeed, the webpage automatically redirects, or forwards, the mobile device to a different webpage. In some cases, the redirect content is "good" content, e.g., if URL shortening was used to simplify the link in the newsfeed, and the content at the shortened URL redirects to an expected webpage. In other cases, the redirect content is "bad" content, e.g., content that was hidden by the link shown in the newsfeed and violates a policy of the social network; this content may also be unexpected or undesired by the user. By analyzing the URL redirect logs provided by mobile devices, the online system identifies websites that perform redirecting and determine whether the redirection is used to cloak bad content. The online system can then discontinue transmitting content with links to the cloaking websites to mobile devices.

In some embodiments, the online system uses a model trained using machine learning to analyze the URL logs received from the mobile devices. The online system first extracts one or more features of a received URL log, such as the final redirect URL or the canonical form of the original URL and/or redirect URL(s). The online system inputs the features to a model, which generates a score indicating the likelihood that the website accessed by the URL performs cloaking. The online model can be trained using prior redirect logs that have been labeled as cloaking or non-cloaking, and the model can be updated on a periodic basis. If the model determines that a URL is cloaking content, the online system can prevent other users from accessing this URL, e.g., by not providing newsfeed content that includes the cloaking URL to mobile devices.

In some embodiments, a browser emulator within the online system accesses the same URL that a mobile device accesses. The browser emulator logs any URL redirects, and compares its URL log to the URL log received from the mobile device. If the URL logs are different, this indicates that the website is performing cloaking by showing different content to the online system itself than to users of the online system.

The URL logs received from the mobile devices allow the online system to assess a webpage's behavior and detect cloaking by the URL or website. The use of URL redirect logs also maintains privacy of the user because it does not involve transmitting any personal data of the user to the online system. In addition to maintaining privacy, transmitting a URL log involves a relatively small amount of data transfer between a mobile device and the online system.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Figure 1:
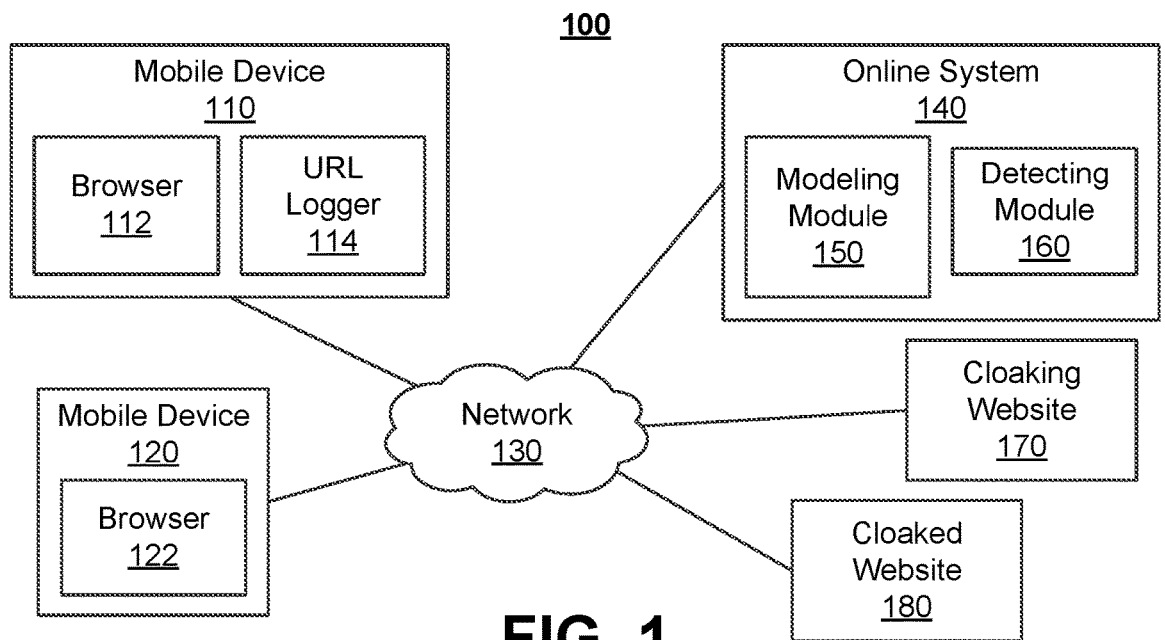
FIG. 1 is a block diagram of a system environment of an online system for detecting cloaking, in accordance with an embodiment.

FIG. 1 is a block diagram of a system environment 100 of an online system 140 for detecting cloaking, according to one embodiment. The system environment 100 shown in FIG. 1 includes mobile devices 110 and 120, a network 130, the online system 140, and third party websites 170 and 180. In alternative configurations, different and/or additional components may be included in the system environment 100. For example, the online system 140 can be a social networking system, a content sharing network, or another system providing content to users. The online system 140 provides content items to the mobile devices 110 and 120. The content items may be posted or provided to the online system 140 by a third party website, such as cloaking website 170, or by users of other mobile devices 110 and 120. Each website is a collection of one or more webpages or other web resources (referred to collectively as "webpages"), each of which has an associated location on the web indicated by a uniform resource locator (URL). The online system 140 enforces a policy regarding the content items it provides. For example, the online system 140 analyzes the behavior of webpages provided by a cloaking website 170 linked to in content provided to a mobile device 110 to determine whether the cloaking website 170 conforms to the policy. If a link to the cloaking website 170 automatically redirects the mobile device 110 to a webpage of a cloaked website 180, which violates the policy, the online system 140 can determine that the cloaking website 170, or a webpage of cloaking website 170 that redirects to the cloaked website 180, also violates the policy. The online system 140 blocks content items or portions of content items that include links to websites that do not conform to the policy from presentation on the mobile devices 110 and 120.

The mobile devices 110 and 120 are computing devices capable of receiving user input as well as transmitting and/or receiving data via the network 130. The mobile device 110 or 120 may be a device having computer functionality, such as a personal digital assistant (PDA), a mobile telephone, a smartphone, a tablet, a laptop computer, or another suitable device. Mobile devices 110 and 120 are configured to communicate via the network 130. In one embodiment, one or both mobile devices 110 and 120 execute an application allowing a user of the mobile device 110 or 120 to interact with the online system 140 via the network 130. For example, mobile device 110 or 120 may interact with the online system 140 through an application programming interface (API) running on a native operating system of the mobile device 110, such as IOS® or ANDROID™.

The mobile devices 110 and 120 each execute a browser 112 or 122 for accessing content linked in content provided by the online system 140. For convenience, browser 112 is described below, but the same description applies to browser 122. The browser 112 requests and receives online content from websites, such as the cloaking website 170 and the cloaked website 180. In some embodiments, the browser 112 operates as a standalone application on the mobile device 110. In other embodiments, the browser 112 is a component of an application executing on the mobile device 110. For example, if the mobile device 110 has a social network application for accessing features of a social networking system represented by the online system 140, the social network application can include the browser 112. If the mobile device 110 does not execute an application for interacting with the online system 140, the browser 112 may also enable interaction between the mobile device 110 and the online system 140.

The browser 112 can access a website, such as the cloaking website 170, which is linked by a content item received from the online system 140. For example, if the online system 140 provides a social network feed to the mobile device 110, a post (also referred to as a "story") on the social network feed can include a URL that links to the cloaking website 170. In general, a feed story is a piece of content from a mobile device, website, the online system 140, or other source that is aggregated by the online system 140 with other feed stories and provided by the online system 140 to mobile devices in a feed. The browser 112 accesses the website linked in a feed story when a user of the mobile device 110 selects a link to the website in the social network feed. In other embodiments, the browser 112 accesses and displays content from a website directly in the social network feed, without receiving an explicit user instruction to retrieve the content. For example, a social network application running on the mobile device 110 may embed web content retrieved by the browser 112 from the first website 170 as a story in the social network feed.

In the example shown in FIG. 1, the mobile device 110 also includes a URL logger 114. The URL logger 114 generates a URL log, which is a list of URLs accessed by the mobile device 110 in response to an initial request to a third party webpage linked in content received from the online system 140, e.g., a webpage of the cloaking website 170. If the webpage at the URL includes a redirect, the browser 112 automatically follows the redirect to another URL, e.g., the URL for a webpage of the cloaked website 180. A webpage includes a redirect by including instructions to cause the device accessing the web page to access a second URL, i.e., the redirect URL. The URL logger 114 logs both of these URLs and any further redirect URLs.

The browser 112 and URL logger 114 may be components of the application for interacting with the online system 140. The application may include instructions to log URLs and send them to the online system 140, e.g., on a periodic basis or in response to a request from the online system 140 to return stored URL logs. In other embodiments, the mobile device 110 receives separate instructions from the online system 114 to log URLs and return one or more URL logs. The mobile device 120 may or may not include a URL logger similar to URL logger 114. In some embodiments, users may opt-in to participate in URL logging; if the user of the mobile device 120 does not opt in, the mobile device 120 will not log URLs.

The mobile devices 110 and 120 are configured to communicate via the network 130, which may comprise any combination of local area and/or wide area networks, using both wired and/or wireless communication systems. In one embodiment, the network 130 uses standard communications technologies and/or protocols. For example, the network 130 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 130 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 130 may be represented using any suitable format, such as hypertext markup language (HTML) or extensible markup language (XML). In some embodiments, all or some of the communication links of the network 130 may be encrypted using any suitable technique or techniques.

The online system 140 includes a modeling module 150 and a detecting module 160. The modeling module 150 generates a cloaking detection model for identifying websites that perform cloaking using the URL logs. The online system 140 receives URL logs from the mobile device 110 and other mobile devices and passes the URL logs to the detecting module 160. The detecting module 160 detects evidence of cloaking in the URL logs using the cloaking detection model. In some embodiments, the online system 140 receives representations of the URL logs. For example, the representations of the URL logs may be encoded or encrypted, or the representations may not include all URLs in the log or the full URLs. For example, the mobile device 110 may extract features of one or more URLs (such as the canonical form provided by the webpage, extensions or top-level domains, particular character strings, selected URLs), or generate numerical summaries of the URL log or a portion or the URL log, and send these features or other derived data to the online system 140. The modeling module 150 and detecting module 160 are described in detail with respect to FIG. 2.

One or more third party websites provide content to the mobile devices 110 and 120 via the online system 140. The cloaking website 170 may perform cloaking by providing content to the online system 140 that is different from content provided to the mobile devices 110 and 120 while representing to the online system 140 that the same content is being provided to both the online system 140 and the mobile devices 110 and 120. For example, the cloaking website 170 may detect information about the user requesting the content, and in response to determining that the user requesting the content is within the online system 140, the cloaking website 170 provides "clean" content that cloaks the content that it provides to the mobile devices 110 and 120. Otherwise, the cloaking website 170 provides a link to cloaked content, e.g., a link to a webpage of the cloaked website 180.

To perform validation that a third party website does not violate a policy, a user internal to the online system 140 may use a device connected to the local network of the online system 140 to review third party websites on behalf of the online system 140. The internal devices used for validating are associated with certain sets of network addresses, for example, internet protocol (IP) addresses or netblocks. Similarly, a server or other type of computing device of the online system 140 may execute a process, for example, a browser emulator or a crawler, to request content from third party website. A third party website that performs cloaking, e.g., the cloaking website 170, can analyze the network addresses of the computing devices sending requests to the cloaking website 170 to determine whether the computing device is operating on behalf of the online system, or if the computing device belongs to a user who is not operating on behalf of the online system and is simply a member or user of the online system 140. If the cloaking website 170 determines that a request is from a computing device operating within the online system 140, the cloaking website returns content that does not violate any policy of the online system 140. If the cloaking website 170 determines that a request is from a user who is not operating on behalf of the online system 140 (e.g., from the mobile device 110), the cloaking website 170 redirects the mobile device 110 to another webpage or website that violates a policy of the online system 140, e.g., a webpage of the cloaked website 180.

Thus, the cloaking website 170 attempts to elude the online system 140 by making it difficult to detect from within the online system 140 that the cloaking website 170 provides content to users that violates a policy. However, by receiving and analyzing URL logs from the mobile device 110, as described herein, the online system 140 is able to detect cloaking and remove offending content from the online system 140.

Figure 2:
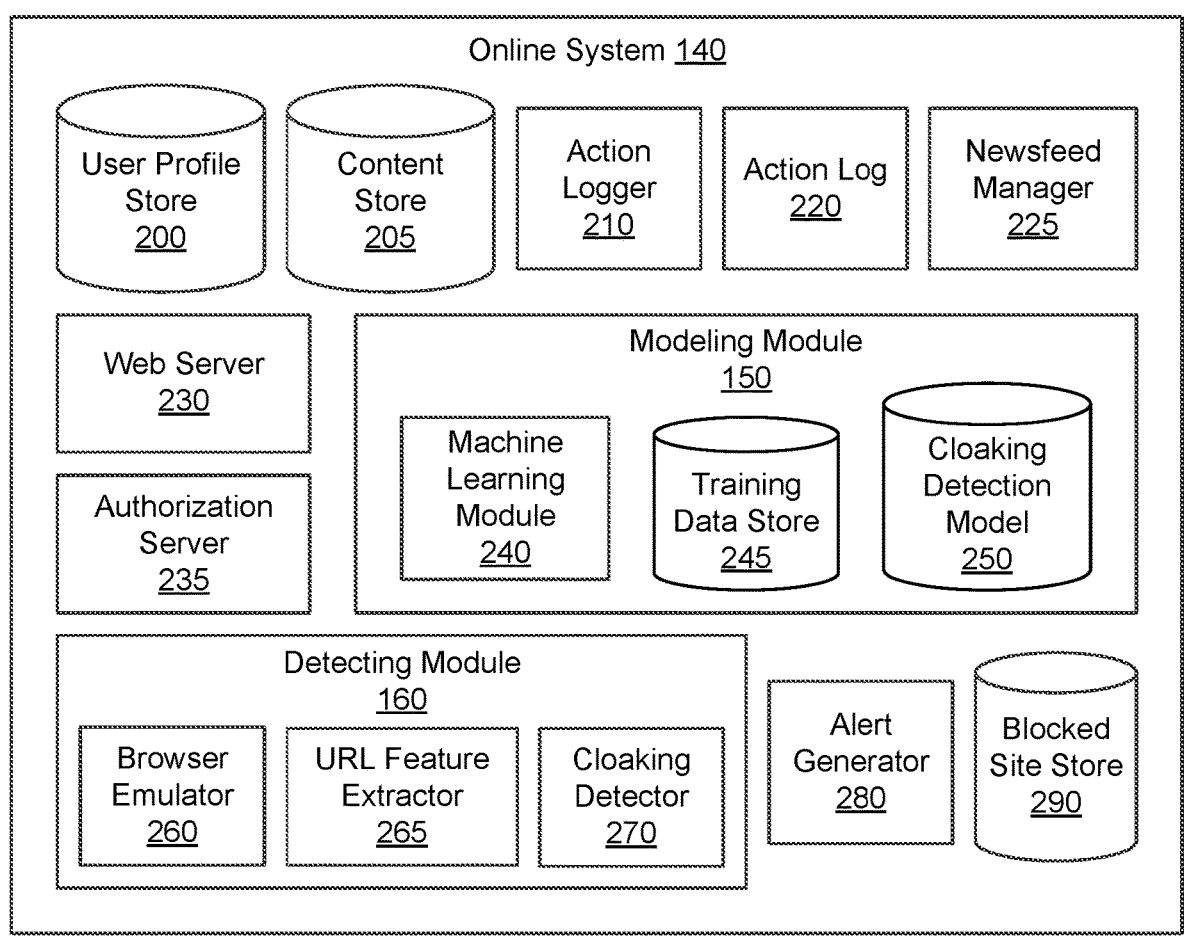
FIG. 2 is a block diagram of an architecture of the online system, in accordance with an embodiment.

FIG. 2 is a block diagram of an architecture of the online system 140, according to one embodiment. The components of the online system 140 provide modules and components for detecting cloaking and protecting users from cloaked content. The online system 140 shown in FIG. 2 includes a user profile store 200, a content store 205, an action logger 210, an action log 220, a newsfeed manager 225, a web server 230, an authorization server 235, a modeling module 150, a detecting module 160, an alert generator 280, and a blocked site store 290. In other embodiments, the online system 140 may include additional, fewer, or different components for various applications. Conventional components such as network interfaces, security functions, load balancers, failover servers, management and network operations consoles, and the like are not shown so as to not obscure the details of the system architecture.

Each user of the online system 140 is associated with a user profile, which is stored in the user profile store 200. A user profile includes declarative information about the user that was explicitly shared by the user and may also include profile information inferred by the online system 140. In one embodiment, a user profile includes multiple data fields, each describing one or more attributes of the corresponding online system user. Examples of information stored in a user profile include biographic, demographic, and other types of descriptive information, such as work experience, educational history, gender, hobbies or preferences, location and the like. A user profile may also store other information provided by the user, for example, images or videos. In certain embodiments, images of users may be tagged with information identifying the online system users displayed in an image, with information identifying the images in which a user is tagged stored in the user profile of the user. A user profile in the user profile store 200 may also maintain references to actions by the corresponding user performed on content items in the content store 205 and stored in the action log 220.

While user profiles in the user profile store 200 are frequently associated with individuals, allowing individuals to interact with each other via the online system 140, user profiles may also be stored for entities such as businesses or organizations. This allows an entity to establish a presence on the online system 140 for connecting and exchanging content with other online system users. The entity may post information about itself, about its products or provide other information to users of the online system 140 using a brand page associated with the entity's user profile. Other users of the online system 140 may connect to the brand page to receive information posted to the brand page or to receive information from the brand page. A user profile associated with the brand page may include information about the entity itself, providing users with background or informational data about the entity.

The content store 205 stores objects that each represents various types of content. Examples of content represented by an object include a page post, a status update, a photograph, a video, a link, a shared content item, a gaming application achievement, a check-in event at a local business, an advertisement, a brand page, or any other type of content. Online system users may create objects stored by the content store 205, such as status updates, photos tagged by users to be associated with other objects in the online system 140, events, groups, or applications. In some embodiments, objects, such as advertisements, are received from third-party websites (e.g., cloaking website 170) or third-party applications separate from the online system 140. In one embodiment, objects in the content store 205 represent single pieces of content, or content "items" or "stories." Hence, online system users are encouraged to communicate with each other by posting text and content items of various types of media to the online system 140 through various communication channels. This increases the amount of interaction of users with each other and increases the frequency with which users interact within the online system 140.

One or more content items included in the content store 205 include content for presentation to a user and a bid amount. The content is text, image, audio, video, or any other suitable data presented to a user. In various embodiments, the content also specifies a page of content. For example, a content item includes a landing page specifying a network address of a page of content to which a user is directed when the content item is accessed. The bid amount is included in a content item by a user and is used to determine an expected value, such as monetary compensation, provided by an advertiser to the online system 140 if content in the content item is presented to a user, if the content in the content item receives a user interaction when presented, or if any suitable condition is satisfied when content in the content item is presented to a user. For example, the bid amount included in a content item specifies a monetary amount that the online system 140 receives from a user who provided the content item to the online system 140 if content in the content item is displayed. In some embodiments, the expected value to the online system 140 of presenting the content from the content item may be determined by multiplying the bid amount by a probability of the content of the content item being accessed by a user.

In various embodiments, a content item includes various components capable of being identified and retrieved by the online system 140. Example components of a content item include: a title, text data, image data, audio data, video data, a landing page, a user associated with the content item, or any other suitable information. The online system 140 may retrieve one or more specific components of a content item for presentation in some embodiments. For example, the online system 140 may identify a title and an image from a content item and provide the title and the image for presentation rather than the content item in its entirety.

Various content items may include an objective identifying an interaction that a user associated with a content item desires other users to perform when presented with content included in the content item. Example objectives include: installing an application associated with a content item, indicating a preference for a content item, sharing a content item with other users, interacting with an object associated with a content item, or performing any other suitable interaction. As content from a content item is presented to online system users, the online system 140 logs interactions between users presented with the content item or with objects associated with the content item. Additionally, the online system 140 receives compensation from a user associated with content item as online system users perform interactions with a content item that satisfy the objective included in the content item.

Additionally, a content item may include one or more targeting criteria specified by the user who provided the content item to the online system 140. Targeting criteria included in a content item request specify one or more characteristics of users eligible to be presented with the content item. For example, targeting criteria are used to identify users having user profile information, edges, or actions satisfying at least one of the targeting criteria. Hence, targeting criteria allow a user to identify users having specific characteristics, simplifying subsequent distribution of content to different users.

In one embodiment, targeting criteria may specify actions or types of connections between a user and another user or object of the online system 140. Targeting criteria may also specify interactions between a user and objects performed external to the online system 140, such as on a third party website. For example, targeting criteria identify users that have taken a particular action, such as sent a message to another user, used an application, joined a group, left a group, joined an event, generated an event description, purchased or reviewed a product or service using an online marketplace, requested information from a third party website, installed an application, or performed any other suitable action. Including actions in targeting criteria allows users to further refine users eligible to be presented with content items. As another example, targeting criteria identifies users having a connection to another user or object or having a particular type of connection to another user or object.

The action logger 210 receives communications about user actions internal to and external to the online system 140 and populates the action log 220 with information about these user actions. Examples of actions include adding a connection to another user, sending a message to another user, uploading an image, reading a message from another user, viewing content associated with another user, and attending an event posted by another user. In addition, a number of actions may involve an object and one or more particular users, so these actions are associated with the particular users as well and stored in the action log 220.

The action log 220 may be used by the online system 140 to track user actions on the online system 140, as well as actions on third party websites that communicate information to the online system 140. Users may interact with various objects on the online system 140, and information describing these interactions is stored in the action log 220. Examples of interactions with objects include: commenting on posts, sharing links, checking-in to physical locations via a mobile device 110 or 120, accessing content items, and any other suitable interactions. Additional examples of interactions with objects on the online system 140 that are included in the action log 220 include: commenting on a photo album, communicating with a user, establishing a connection with an object, joining an event, joining a group, creating an event, authorizing an application, using an application, expressing a preference for an object ("liking" the object), and engaging in a transaction. Additionally, the action log 220 may record a user's interactions with advertisements on the online system 140 as well as with other applications operating on the online system 140. In some embodiments, data from the action log 220 is used to infer interests or preferences of a user, augmenting the interests included in the user's user profile and allowing a more complete understanding of user preferences.

The action log 220 may also store user actions taken on a third party website, such as an external website, and communicated to the online system 140. For example, an e-commerce website may recognize a user of an online system 140 through a social plug-in enabling the e-commerce website to identify the user of the online system 140. Because users of the online system 140 are uniquely identifiable, e-commerce websites, such as in the preceding example, may communicate information about a user's actions outside of the online system 140 to the online system 140 for association with the user. Hence, the action log 220 may record information about actions users perform on a third party website, including webpage viewing histories, advertisements that were engaged, purchases made, and other patterns from shopping and buying. Additionally, actions a user performs via an application associated with a third party website and executing on a mobile device 110 or 120 may be communicated to the action logger 210 by the application for recordation and association with the user in the action log 220.

In one embodiment, the online system 140 identifies stories likely to be of interest to a user through a "newsfeed" presented to the user. A story presented to a user describes an action taken by an additional user connected to the user and identifies the additional user. In some embodiments, a story describing an action performed by a user may be accessible to users not connected to the user that performed the action. The newsfeed manager 225 may generate stories for presentation to a user based on information in the action log 220 or may select candidate stories included in content store 205. One or more of the candidate stories are selected and presented to a user by the newsfeed manager 225.

For example, the newsfeed manager 225 receives a request to present one or more stories to a social networking system user. The newsfeed manager 225 accesses one or more of the user profile store 200, the content store 205, and the action log 220 to retrieve information about the identified user. For example, stories or other data associated with users connected to the identified user are retrieved. The retrieved stories or other data are analyzed by the newsfeed manager 225 to identify content likely to be relevant to the identified user. For example, stories associated with users not connected to the identified user or stories associated with users for which the identified user has less than a threshold affinity are discarded as candidate stories. Based on various criteria, the newsfeed manager 225 selects one or more of the candidate stories for presentation to the identified user. Additionally, the newsfeed manager 225 may select candidate stories based in part on compensation received by the social networking system 140 for presenting a candidate story to one or more users. This allows an advertiser or other entity to sponsor a story for presentation to social networking system users.

The web server 230 links the online system 140 via the network 130 to the mobile devices 110 and 120, as well as to the one or more third party websites, such as cloaking website 170. The web server 230 serves web pages, as well as other content, such as JAVA®, FLASH®, XML, and so forth. The web server 230 may receive and route messages between the online system 140 and the mobile devices 110 and 120, for example, instant messages, queued messages (e.g., email), text messages, short message service (SMS) messages, or messages sent using any other suitable messaging technique. A user may send a request to the web server 230 to upload information (e.g., images or videos) that are stored in the content store 205. Additionally, the web server 230 may provide application programming interface (API) functionality to send data directly to native mobile device operating systems, such as IOS®, ANDROID™, or BlackberryOS.

The authorization server 235 enforces one or more privacy settings of the users of the online system 140. A privacy setting of a user determines how particular information associated with a user can be shared, and may be stored in the user profile of a user in the user profile store 200 or stored in the authorization server 235 and associated with a user profile. In one embodiment, a privacy setting specifies particular information associated with a user and identifies the entity or entities with whom the specified information may be shared. Examples of entities with which information can be shared may include other users, applications, third party websites, or any entity that can potentially access the information. Examples of information that can be shared by a user include user profile information like profile photo, phone numbers associated with the user, user's connections, actions taken by the user such as adding a connection, changing user profile information and the like.

The privacy setting specification may be provided at different levels of granularity. In one embodiment, a privacy setting may identify specific information to be shared with other users. For example, the privacy setting identifies a work phone number or a specific set of related information, such as, personal information including profile photo, home phone number, and status. Alternatively, the privacy setting may apply to all the information associated with the user. Specification of the set of entities that can access particular information may also be specified at various levels of granularity. Various sets of entities with which information can be shared may include, for example, all users connected to the user, a set of users connected to the user, additional users connected to users connected to the user all applications, all third party systems, specific third party systems, or all external systems.

One embodiment uses an enumeration of entities to specify the entities allowed to access identified information or to identify types of information presented to different entities. For example, the user may specify types of actions that are communicated to other users or communicated to a specified group of users. Alternatively, the user may specify types of actions or other information that is not published or presented to other users.

The authorization server 235 includes logic to determine if certain information associated with a user can be accessed by a user's friends, third-party system and/or other applications and entities. For example, a third-party system that attempts to access a user's comment about a uniform resource locator (URL) associated with the third-party system (e.g., cloaking website 170) must get authorization from the authorization server 235 to access information associated with the user. Based on the user's privacy settings, the authorization server 235 determines if another user, a third-party system, an application or another entity is allowed to access information associated with the user, including information about actions taken by the user. For example, the authorization server 235 uses a user's privacy setting to determine if the user's comment about a URL associated with the third-party system can be presented to the third-party system or can be presented to another user. This enables a user's privacy setting to specify which other users, or other entities, are allowed to receive data about the user's actions or other data associated with the user.

In some embodiments, the authorization server 235 enforces privacy settings relating to the sharing of URLs visited by the mobile device 110 with the online system 140. For example, one privacy setting may permit the mobile device 110 to transmit URL logs, and a second privacy setting may prevent the mobile device 120 from transmitting URL logs. In some embodiments, the privacy setting may specify that a URL log can be shared if certain information is obfuscated at the mobile device 110 or withheld from the URL log.

The modeling module 150 includes a machine learning module 240, a training data store 245, and a cloaking detection model 350. The machine learning module 240 trains the cloaking detection model 250 based on a training data store 245. The machine learning module 240 uses machine learning techniques to generate the cloaking detection model 250. The cloaking detection model 250 generated by the machine learning module 240 is used to analyze a URL log or features of a URL log received from the mobile device 110. The URL log includes a base URL linked by content from the online system 140 (e.g., a URL in a newsfeed story) and any URL redirects accessed by the mobile device 110 in response to the request to the base URL. The input to the cloaking detection model 250 may be the URL log itself, or data extracted or derived from the URL log, e.g., one or more extracted features of one or more URLs (such as the canonical form, extensions or top-level domains, particular character strings, selected URLs), or numerical summaries of the URL log or a portion or the URL log. The output of the cloaking detection model 250 is a score indicating a likelihood that the base URL or website that returned the redirect URLs performs cloaking. For example, if the score is greater than a threshold value, the website is determined to perform cloaking, and if the score is less than the threshold, the website is determined not to perform cloaking.

In an embodiment, the cloaking detection model 250 comprises a set of weights associated with a set of features for generating an output score as a weighted aggregation of scores associated with the features. In another embodiment, the cloaking detection model 250 comprises the set of weights along with instructions for aggregating the weights for generating the output score. In some embodiments, the cloaking detection model 250 also receives a URL log, or features of the URL log, generated from the same base URL from within the online system 140, e.g., using browser emulator 260. In such embodiments, the likelihood of cloaking calculated by the cloaking detection model 250 may be based on a similarity or difference between the URL log from the mobile device 110 and the URL log from the online system 140.

To train the cloaking detection model 250, data from the training data store 345 is ingested by the machine learning module 340. The training data includes individual URLs or URL logs along with data describing the URLs or URL logs, such as whether one or more URLs or websites included in the URL log violates a particular policy, why the URL or website violates the policy, a type or subject matter of the content, the underlying content provider, or any other data relevant to training the model cloaking detection model 250. The training data store includes both positive samples (e.g., URLs obtained from mobile devices redirected to cloaking websites) and negative samples (e.g., URLs obtained from mobile devices redirected to non-cloaking websites). In some embodiments, the training data does not provide data specific to a particular policy, and instead merely indicates whether or not each URL or URL log is in violation of the set of policies. The training data store 245 may include data obtained from the action log 220. The action log 220 may include data describing the content provided by an online system monitor or by outside users, such as users of mobile devices 110 and 120. In some embodiments, the training data also includes URL logs obtained from within the online system 140.

The machine learning module 240 may generate the cloaking detection model 250 based on optimization of different types of content analysis models, including but not limited to algorithms that analyze received URLs or URL logs separately or that analyze a set of URL logs together. The cloaking detection model 250 generated by the machine learning module 240 may include a neural network, a tree-based model, kernel methods, splines, or an ensemble of one or more of these techniques. The machine learning module 240 may determine the weights of the model, e.g., the weights of edges of the neural network corresponding to the cloaking detection model 250. The machine learning module 240 may also train a URL feature extractor 265 to extract features of the URLs or URL logs, which are used as inputs into the cloaking detection model 250.

In some embodiments, the machine learning module 240 may further generate one or more classifiers for interpreting the URL logs and/or the output of the cloaking detection model 250. The cloaking detection model 250 outputs one or more scores based on the URL log, and the trained classifier determines whether to determine the score indicates that a URL performs cloaking. In one embodiment, training the classifier involves learning a threshold to compare to a score output by the cloaking detection model 250. The classifier may include multiple thresholds, e.g., one for each enforced policy. The machine learning module 240 may periodically update the model 250 and/or classifier based on additional training data, or based on updated policies.

Figures 3, 4:
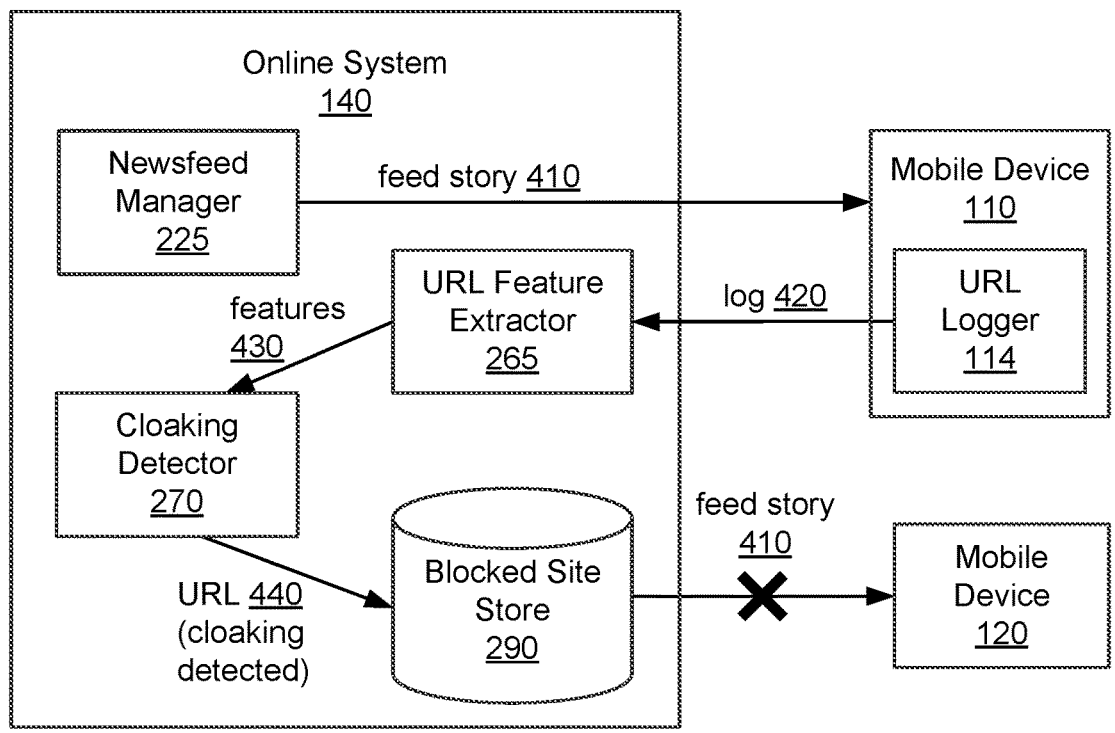
FIG. 3 shows two exemplary URL logs, in accordance with an embodiment.
FIG. 4 is a flow diagram showing cloaking detection using a URL log, in accordance with an embodiment.

The detecting module 160 includes a browser emulator 260, URL feature extractor 265, and a cloaking detector 270. The browser emulator 260 can be used to generate local URL logs, and in particular, may navigate to the same URLs that are provided in the newsfeed content and to which the mobile device 110 navigates. The browser emulator 260 requests and receives online content from websites, such as the cloaking website 170. As described above, the content received from the cloaking website 170 by the browser emulator 260 in the online system 140 differs from the content received from the same cloaking website 170 by the browser 112 of a mobile device 110. An example of this is shown in FIG. 3. The browser emulator 260 may be an emulator, a crawler, or any process that invokes application programming interfaces (APIs) of a website to access web pages of the website. For example, the browser emulator 260 comprises instructions that send an HTTP (hypertext transfer protocol) requests to a website and receive a webpage in response. For example, when the browser 112 requests content from the cloaking website 170, the browser emulator 260 also requests the same content from the cloaking website 170. In some embodiments, the browser emulator 260 requests from the cloaking website 170 all external content that is linked in a newsfeed provided to the mobile devices 110, regardless of whether the browser 112 of the mobile device 110 accesses the linked content. In other embodiments, the browser emulator 260 requests a sample of linked content provided to mobile device 110, or a sample of linked content accessed by the browser 112. The sample may be a random sample (e.g., the online system 140 may randomly select mobile devices to mirror, randomly select content that is selected by a user to mirror, randomly select links in a social network feed to mirror, etc.). Alternatively, the sample may be selected based a likelihood of cloaking associated with the cloaking website 170 or some other predictive factor.

The URL feature extractor 265 can extract one or more features of the URLs accessed in response to an initial content request to the base URL, e.g., features of a URL log received from the mobile device 110 in response to the mobile device 110 navigating to the cloaking website 170. The feature extractor 265 is programmed or trained to extract features relevant for determining whether a website is performing cloaking. The features may include one or more redirect URLs (e.g., the final URL accessed after a redirect chain) or portions of one or more redirect URLs (e.g., the extension). In some embodiments, the website at a URL provides the canonical form of the URL, i.e., the master copy of a webpage as indicated by the website, and the feature extractor 265 extracts one or more features of the canonical form, e.g., the host website, the top-level domain, or other features. In some embodiments, the feature extraction may obfuscate the URLs in some way, e.g., by generating a vector or embedding based on one or more URLs or the URL log. In some embodiments, a URL feature extractor 265 executes at the mobile device 110, and the mobile device 110 extracts URL features and transmits the URL features, rather than the full URL log, to the online system 140. In such embodiments, the mobile device 110 may access URLs that have a first format (e.g., a text format), and transmit representations of the accessed URLs that have a second format different from the first format (e.g., a numerical format). This helps maintain privacy of the user, and it may reduce the amount of data transmitted from the mobile device 110 to the online system 140.

In some embodiments, the feature extractor 265 is trained by the machine learning module 240. The machine learning module 240 can ingest URLs or URL logs that are labeled as violating or not violating a policy, or performing or not performing cloaking. The machine learning module 240 can identify a set of features that are useful for identifying cloaking or a policy violation, and instruct the URL feature extractor 265 to extract the identified features. The URL features may be represented numerically, e.g., as a set of 0s and 1s indicating whether each of feature of a list of URL features is found in the URL log, or as a vector or embedding describing characteristics of the URL log in a latent space.

The cloaking detector 270 determines whether the cloaking website 170 performs cloaking based on the features extracted by the feature extractor 265 from the URL log received from the mobile device 110. The cloaking detector 270 inputs the extracted features into the trained cloaking detection model 250, which outputs a score. In some embodiments, the cloaking detector 270 uses a classifier that compares the score to a learned threshold to determine whether the score, and the URL log, indicates that the cloaking website 170 performs cloaking and violates a policy. In some embodiments, the cloaking detector 270 compares the URL log received from the mobile device 110 to a URL log generated within the online system 140 using the browser emulator 260 to determine whether the two URL logs, or features of the URL logs, differ, which may indicate cloaking.

If cloaking is detected, the online system 140 can transmit instructions or alerts to mobile devices 110 and 120 regarding the cloaking website 170 using the alert generator 280. Alternatively, the online system 140 can discontinue providing the cloaking URL, or all content from the cloaking website 170 or including links to the cloaking website 170, to mobile devices 110 and 120 using the blocked store site 290. For example, if the online system 140 determines that certain newsfeed content identified for sending to mobile devices includes a link to the cloaking website 170, the online system 140 blocks this newsfeed content. Alternatively, if the online system 140 generates a newsfeed, the online system 140 may include a link to a website in the newsfeed content only if the link was not previously added to the blocked store site 290.

The alert generator 280 provides instructions to prevent or discourage mobile devices 110 and 120 accessing the online system 140 from accessing the cloaking website 170 after the cloaking detector 270 detects that the cloaking website 170 is performing cloaking. For example, if the mobile device 110 is running an application that accesses the online system 140, the alert generator 280 can transmit an instruction to application that prevents the browser 112 of that application from accessing the cloaking website 170. Alternatively, the instruction may warn a user of the browser 112 that the website 170 may be performing cloaking, but still allow the browser 112 to access content from the cloaking website 170 if the user chooses to.

The blocked site store 290 stores information identifying websites that perform cloaking. The online system 140 can reference the blocked site store 290 when providing content to users. For example, before including a particular story from the content store 205 in a newsfeed, the online system 140 can compare the content with the websites in the blocked site store 290 to determine whether the content item should be included in the feed. If the content item includes content from a blocked site, or links to a blocked site, the online system 140 does not include this story in the feed. In other embodiments, the online system 140 can remove the story that included the blocked site from the content store 205, and the blocked site store 290 can be used to prevent new stories that involve a blocked site from being added to the content store 205.

FIG. 3 shows two exemplary URL logs 300 and 350. The first URL log 300 shows a chain of URLs requested by the browser 112 on the mobile device 110 in response to the browser 112 requesting a first URL. The second URL log 300 shows a chain of URLs requested by the browser emulator 260 in the online system 140 in response to the browser emulator 260 requesting the same first URL. As shown in FIG. 3, the mobile device 110 receives additional redirects and ends up at a different URL than the online system 140.

More particularly, the first URL log 300 shows that the browser 112 on the mobile device 110 requests a webpage linked by a URL in a newsfeed received from the online system 140. The webpage at the requested URL (http://www.a.com/abc) provides a first redirect that changes the top level domain from .com to .biz. The change of a top level domain is often not the result of cloaking, but instead is done by a website to ensure that if a user accidentally uses the wrong domain, they can reach their intended destination. When the browser 112 accesses the first redirect, it is provided redirected to a redirect URL that includes an explicit redirect to http://www.def.com/1, to which the browser is again redirected. This URL redirects the browser 112 again to http://www.def.xxx, which is the final redirect URL, and the webpage at this URL is displayed by the mobile device 110. This displayed webpage may be quite different from the requested URL, and the top-level domain (.xxx) indicates that the final URL may be pornographic and, therefore, in violation of a policy of the online system 140. The feature extractor 265 could be configured to extract different types of features from the URL log 300 that indicate that it may perform cloaking. Features that the feature extractor 265 may extract can include the requested and displayed URLs (http://www.a.com/abc and http://www.def.xxx, which are quite different), the extension of the displayed URL (.xxx), the extensions of the other requested URLs (.com and .biz), the inclusion of an explicit redirect in redirect 2 (redirect=http://www.def.com/1), and the number of redirects (4).

The second URL log 350 shows that the browser emulator 260 within the online system 140 requests the same URL (http://www.a.com/abc), which provides the same first redirect that changes the top level domain from .com to .biz. When this URL is requested by the browser emulator 260, the first redirect URL does not provide any further redirects, and the first redirect URL is the final webpage provided to the browser emulator 260 in response to the first request. In this case, the webpage http://www.a.biz/abc may have recognized that the request was coming from within the online system 140 and, as a result, the webpage decided not to redirect the browser emulator 260. The feature extractor 265 can extract any of the features described with respect to the first URL log 350.

In some embodiments, the online system 140 compares the two URL logs 300 and 350 or their extracted features to determine whether the requested URL is performing cloaking. In this example, the difference between the two URL logs 300 and 350 may be sufficient to determine that the requested URL is performing cloaking. However, in some cases, different redirects for different browsers may be legitimate, e.g., if the mobile device 110 is located in a different country from the online system 140, or if the browser emulator 260 is emulating a different type of browser from the browser 112 (e.g., if the browser emulator 260 is emulating a desktop browser, while the browser 112 is a mobile browser). Thus, using the machine-trained cloaking detection model 250 to analyze the URL logs 300 and 350 may provide more accurate or robust results than a simple comparison between the two URL logs 300 and 350.

FIG. 4 is a flow diagram showing cloaking detection using a URL log, in accordance with an embodiment. FIG. 4 includes the online system 140 and the mobile devices 110 and 120. The newsfeed manager 225 of the online system 140 selects a feed story 410 to transmit to the mobile device 110. The online system 140 transmits this feed story 410 to the mobile device 110, which displays the feed story, e.g., as part of a newsfeed that contains additional feed stories. The feed story 410 includes at least one URL that links to content from an external website, e.g., the cloaking website 170.

The mobile device 110 (e.g., using the browser 112) navigates to the URL in the feed story 410. The URL logger 114 logs the URL to which the mobile device 110 navigates, along with any redirects. The URL logger 114 may only log automatic redirects of URLs from feed stories, rather than logging all browsing activity of the browser 112. For example, the URL logger 114 may begin logging URLs manually selected in feed stories or automatically accessed to load content into the newsfeed. The URL logger 114 may then log any redirects by, e.g., logging subsequent URLs that the browser 112 accessed without a user command, or subsequent URLs that the browser accessed within a certain amount of time. This may prevent the URL logger 114 from logging browsing activity that goes beyond viewing content linked in the newsfeed.

The URL logger transmits the URL log 420 to the online system 140. The URL feature extractor 265 extracts one or more features 430 of the URL log 420. For example, the features 430 may be an embedding describing characteristics of the URL log in a latent space, or a vector of values indicating whether or not particular features are present in the URL log. As described with respect to FIG. 2, the feature extractor 265 is programmed or trained to extract features relevant for determining whether a website is performing cloaking. The features 430 are input to the cloaking detector 270.

The cloaking detector 270 determines, using the cloaking detection model 250, whether the website at the URL in the feed story 410 is performing cloaking. As described with respect to FIGS. 2 and 3, the cloaking detector 270 may make this determination based on the URL log 420 alone, or in combination with a second URL log generated locally by the online system 140. The cloaking detector 270 may further include a classifier for determining whether a likelihood score output by the cloaking detector 270 is above a particular threshold. If the cloaking detector 270 detects cloaking, the cloaking detector 270 transmits the URL 440 from the feed story 410 to the blocked site store 290.

The blocked site store 290 stores the URL 440 and blocks feed stories that include the URL 440, such as the feed story 410, from being transmitted to mobile devices, such as mobile device 120. The X on the arrow showing the feed story being transmitted to the mobile device 120 indicates that the blocked site store 290 blocks the feed story 410. The blocked store site 290 may also block additional feed stories that include the same URL, other URLs from the URL log 420, or other URLs for the same website as the URL 440.

Figure 5:
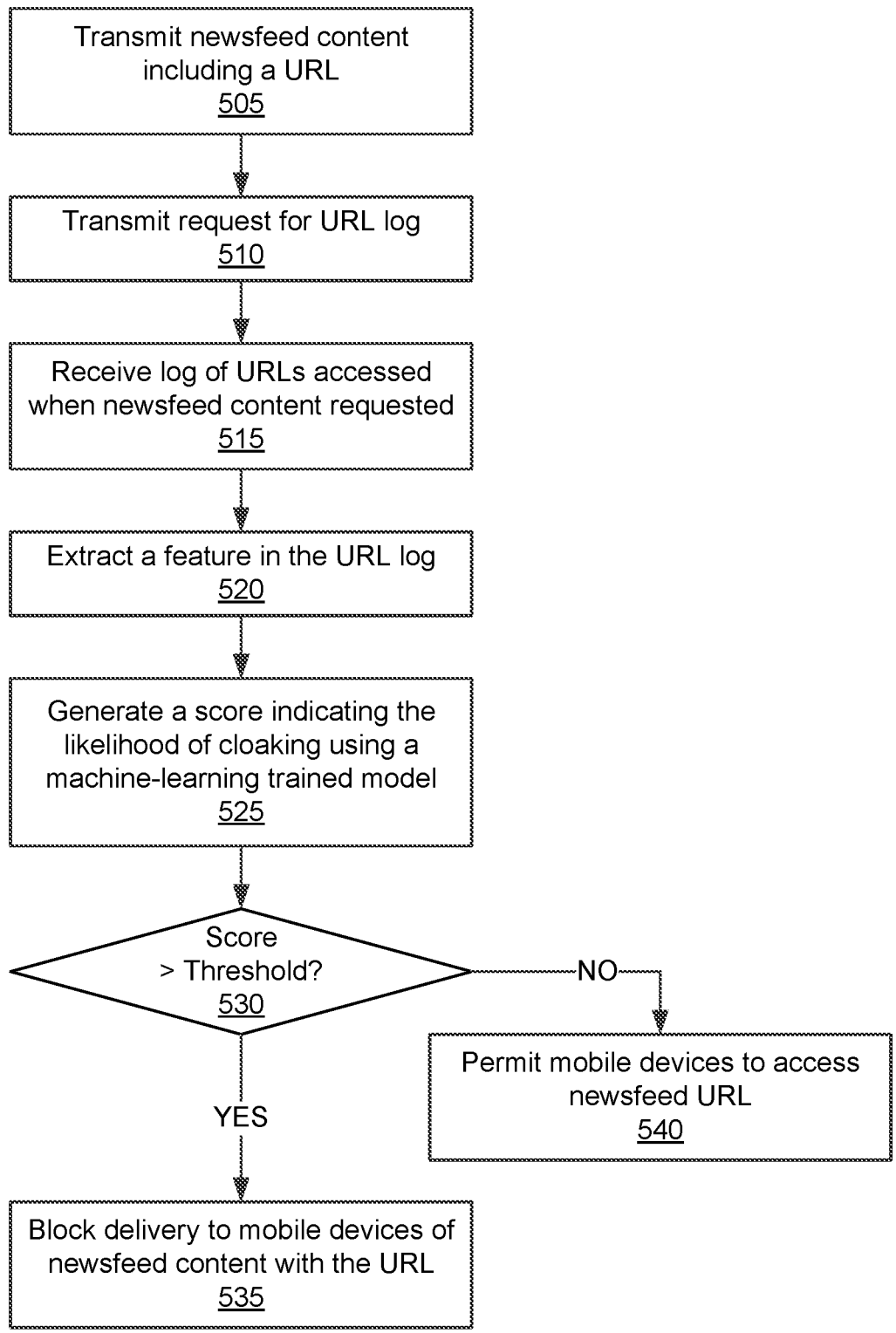
FIG. 5 is a flow diagram of a process for detecting cloaking based on a URL log, in accordance with an embodiment.

FIG. 5 is a flow diagram of a process 500 for detecting cloaking based on a URL log, in accordance with an embodiment. The process 500 may be performed by an online system 140. Other entities may perform some or all of the steps in the process 500 in other embodiments. For example, one or more steps may be performed by a mobile device 110 or an external service provider. Likewise, embodiments may include different and/or additional steps, or perform the steps in different orders.

The online system 140 transmits newsfeed content that includes a URL to a mobile device 110. The newsfeed content may be selected by the newsfeed manager 225.

The online system 140 transmits 510 a request for a URL log to the mobile device 110. The request may include a request for a log already stored by the URL logger 114. In other embodiments, the request includes instructions for the mobile device 110 to collect a URL log and transmit it back to the online system 140.

The online system 140 receives 515 a log of URLs accessed by the mobile device 110 when the URL in the newsfeed content was requested by the mobile device 110. The full URL logs or representations of the URL logs may be received. The online system 140 extracts 520 one or more features from the URL log, e.g., using feature extractor 265.

The online system 140 generates 525 a score indicating the likelihood of cloaking using a machine-learning trained model. For example, the cloaking detector 270 may generate the score using the cloaking detection model 250, which was trained by the machine learning module 240.

The online system 140 (e.g., the cloaking detector 270) compares 530 the score to a threshold to determine whether the score is larger than the threshold. The threshold may be programmed by an operator or may be trained using machine learning.

If the score is greater than the threshold, the online system 140 blocks 535 delivery to mobile devices (e.g., mobile device 120) of newsfeed content that includes the URL, e.g., by adding the URL to the blocked site store 290. If the score is less than the threshold, the online system 140 permits 540 mobile devices to access the newsfeed URL, e.g., by not adding the URL to the blocked site store 290.

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method comprising:
    transmitting, by an online system, a feed story to a first mobile device of a user of the online system, the feed story including a uniform resource locator (URL) of a feed story website;
    receiving, by the online system from the mobile device, a URL log comprising representations of a plurality of URLs accessed by the first mobile device in response to requesting content from the feed story website;
    extracting a feature of at least one of the representations of the plurality of URLs in the URL log;
    inputting the extracted feature into a model trained using machine learning to identify websites that perform cloaking;
    generating, by the model, a score indicating a likelihood that the feed story website performs cloaking;
    comparing the score to a threshold to determine that the feed story website performs cloaking; and
    in response to determining that the feed story website performs cloaking, limiting delivery of content including the URL of the feed story website.

2. The method of claim 1, wherein limiting delivery of content including the URL of the feed story website comprises blocking the content from feeds of mobile devices of users of the online system.

3. The method of claim 1, wherein the first mobile device is running an application configured to perform steps comprising: accessing a feed including the feed story, requesting content from the feed story website, and logging representations of a plurality of URLs accessed by the application in response to requesting content from the feed story website.

4. The method of claim 1, wherein the plurality of URLs accessed by the first mobile device have a first format, and the representations of the plurality of URLs transmitted by the mobile device have a second format different from the first format.

5. The method of claim 1, further comprising:
    generating, at the online system, the model for identifying websites that perform cloaking by:
        receiving, from a plurality of mobile devices, a plurality of logs of URLs accessed in response to content requests;
        receiving a set of data indicating whether each of a set of URLs is associated with cloaking, the set of URLs comprising URLs in the plurality of logs of URLs; and
        training the model using the plurality of logs of URLs and the set of data.

6. The method of claim 5, further comprising:
    further training the model based on additional logs of URLs received from mobile devices and data indicating whether at least one of the additional URLs performs cloaking.

7. The method of claim 1, further comprising transmitting, by the online system to the first mobile device, a request for the URL log.

8. The method of claim 1, further comprising transmitting, by the online system to the first mobile device, instructions to:
    generate the URL log by logging representations of a plurality of URLs to which the first mobile device is directed in response to requesting content from a website; and
    return the URL log to the online system.

9. The method of claim 1, wherein the URL log includes a representation of an initial URL requested by the first mobile device and a representation of at least one redirect URL provided by the feed story website.

10. The method of claim 1, wherein extracting a feature of the representation of a URL in the URL log comprises:
    identifying a canonical form of a selected URL in the log; and
    extracting a feature of the canonical form of the selected URL.

11. A method comprising:
    receiving, from a first mobile device, a URL log comprising representations of a plurality of URLs accessed by the first mobile device in response to an initial request for content from a website, wherein the plurality of URLs accessed by the first mobile device have a first format, and the representations of the plurality of URLs transmitted by the mobile device have a second format different from the first format;
    extracting a feature of at least one of the representations of the plurality of URLs in the URL log;
    determining, based on the extracted feature and using a model trained using machine learning, that the website performs cloaking; and in response to determining that the website performs cloaking, preventing a second mobile device from requesting the content from the website.

12. The method of claim 11, wherein preventing the second mobile device from requesting the content from the website comprises blocking delivery of a URL of the website to the second mobile device.

13. The method of claim 11, wherein the first mobile device is running an application for accessing content from the website, and for logging representations of a plurality of URLs accessed by the application.

14. The method of claim 11, wherein determining, based on the extracted feature and using the model trained using machine learning, that the website performs cloaking comprises:
  inputting the extracted feature into the model, the model trained to identify websites that perform cloaking; and
  receiving from the trained model an indication that the website performs cloaking.

15. The method of claim 14, further comprising:
  generating, by the model, a score indicating a likelihood that a website performs cloaking based on the extracted feature, and
  comparing the score to a threshold to determine that the website performs cloaking.

16. The method of claim 14, further comprising:
  generating the model for identifying websites that perform cloaking by:
    receiving, from a plurality of mobile devices, a plurality of logs of URLs accessed in response to content requests;
    receiving a set of data indicating whether each of a set of URLs is associated with cloaking, the set of URLs comprising URLs in the plurality of logs of URLs; and
    training the model based on the plurality of logs of URLs and the set of data.

17. The method of claim 11, wherein the URL log includes a representation of an initial URL requested by the first mobile device and a representation of at least one redirect URL provided by the website.

18. The method of claim 11, wherein extracting a feature of the representations of the plurality of URLs comprises:
  isolating a canonical portion of each URL of the plurality of URLs; and
  extracting a feature of the canonical portions of the plurality of URLs.

19. A non-transitory computer readable medium storing computer instructions that when executed by a computer processor cause the computer processor to perform steps comprising:
  transmitting, by an online system, a feed story to a first mobile device of a user of the online system, the feed story including a uniform resource locator (URL) of a feed story website;
  receiving, by the online system from the mobile device, a URL log comprising representations of a plurality of URLs accessed by the first mobile device in response to requesting content from the feed story website;
  extracting a feature of at least one of the representations of the plurality of URLs in the URL log;
  inputting the extracted feature into a model trained using machine learning to identify websites that perform cloaking;
  generating, by the model, a score indicating a likelihood that the feed story website performs cloaking based the extracted feature;
  comparing the score to a threshold to determine that the feed story website performs cloaking; and
  in response to determining that the feed story website performs cloaking, limiting delivery of content including the URL of the feed story website.

20. A non-transitory computer readable medium storing computer instructions that when executed by a computer processor causes the computer processor to perform steps comprising:
  receiving, from a first mobile device, a URL log comprising representations of a plurality of URLs accessed by the first mobile device in response to an initial request for content from a website, wherein the plurality of URLs accessed by the first mobile device have a first format, and the representations of the plurality of URLs transmitted by the mobile device have a second format different from the first format;
  extracting a feature of at least one of the representations of the plurality of URLs in the URL log;
  determining, based on the extracted feature and using a model trained using machine learning, that the website performs cloaking; and
  in response to determining that the website performs cloaking, preventing a second mobile device from requesting the content from the website.

* * * * *